(12) United States Patent
Rauner et al.

(10) Patent No.: US 8,706,337 B2
(45) Date of Patent: Apr. 22, 2014

(54) METHOD FOR OPERATING A HYBRID VEHICLE

(75) Inventors: Thomas Rauner, Blaubeuren (DE); Sebastian Neu, Reutlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 69 days.

(21) Appl. No.: 13/440,369

(22) Filed: Apr. 5, 2012

(65) Prior Publication Data

US 2012/0265386 A1      Oct. 18, 2012

(30) Foreign Application Priority Data

Apr. 12, 2011 (DE) .......................... 10 2011 001 994

(51) Int. Cl.
*B60W 20/00* (2006.01)

(52) U.S. Cl.
USPC ....... 701/22; 701/54; 180/65.275; 180/65.28; 180/65.285; 477/3

(58) Field of Classification Search
USPC .......................... 701/22, 54, 69, 80; 477/3, 7; 180/65.21–65.285
See application file for complete search history.

(56) References Cited

U.S. PATENT DOCUMENTS

| 5,453,930 | A | * | 9/1995 | Imaseki et al. ................... 701/22 |
| 5,472,265 | A | * | 12/1995 | Ohnuma ........................... 303/3 |
| 2009/0088914 | A1 | | 4/2009 | Mizutani et al. |
| 2010/0167869 | A1 | | 7/2010 | Falkenstein et al. |

FOREIGN PATENT DOCUMENTS

| DE | 100 35 027 | 1/2002 |
| DE | 10 2007 023 164 | 11/2008 |
| DE | 10 2008 010 558 | 9/2009 |

* cited by examiner

*Primary Examiner* — Richard Camby
(74) *Attorney, Agent, or Firm* — Gerald E. Hespos; Michael J. Porco; Matthew T. Hespos

(57) ABSTRACT

A method for operating a hybrid vehicle having a first driven axle (10) that can be driven exclusively electrically by at least one first electric machine (14) assigned to the first axle (10), and having a second driven axle (12) that can be driven by at least one second electric machine (16) assigned to the second axle (12) and/or by an internal combustion engine (15) assigned to the second axle (12). During each current driving cycle of the hybrid vehicle a kilometer reading/mileage reading, or a variable representing the kilometer reading/mileage reading, of the hybrid vehicle is determined, and an operating strategy is determined for a subsequent new driving cycle of the hybrid vehicle on the basis of the kilometer reading/mileage reading, or the variable representing the kilometer reading/mileage reading, of the previous driving cycle.

10 Claims, 1 Drawing Sheet

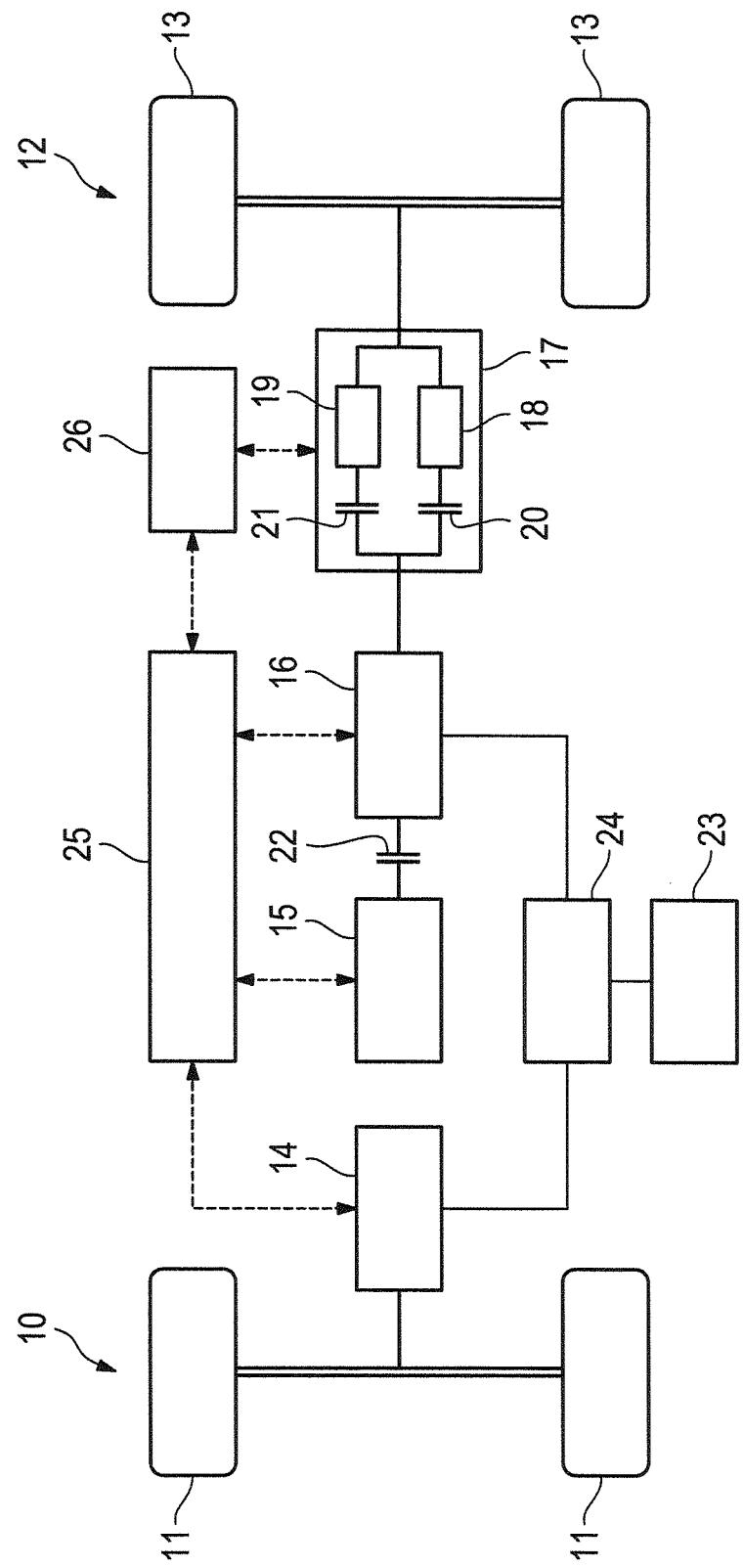

METHOD FOR OPERATING A HYBRID VEHICLE

CROSS REFERENCE TO RELATED APPLICATION

This application claims priority under 35 USC 119 to German Patent Appl. No. 10 2011 001 994.4 filed on Apr. 12, 2011, the entire disclosure of which is incorporated herein by reference.

BACKGROUND OF THE INVENTION

1. Field of the Invention

The invention relates to a method for operating a hybrid vehicle.

2. Description of the Related Art

FIG. 1 shows a highly schematic view of a drive train scheme of a high performance hybrid vehicle, in particular of the high performance hybrid vehicle marketed by the assignee of the subject invention under the type designation "Porsche 918 Spyder Hybrid". The drive train in FIG. 1 has two driven axles, specifically a first driven axle 10 with wheels 11 and a second driven axle 12 with the wheels 13. The first axle 10 preferably is the front axle and the second axle 12 preferably is the rear axle of the hybrid vehicle. The drive train of FIG. 1 has three power sources. The first axle 10 thus is assigned a first electric machine 14 via which the first axle 10 can be driven exclusively electrically. The second axle 12 is assigned an internal combustion engine 15 and a second electric machine 16, via which the second axle 12 can be driven. The second axle 12 can be driven either purely electrically and exclusively via the electric machine 16 assigned thereto, in a hybrid fashion via the electric machine 16 and the internal combustion engine 15, or exclusively via the internal combustion engine 15 in a purely combustion-engine-operated fashion.

According to FIG. 1, a transmission 17, which is embodied as a double clutch transmission in FIG. 1, is connected between the second axle 12 and the electric machine 16 assigned to the second axle 12. The double clutch transmission 17 therefore comprises two component transmissions 18 and 19 that are assigned respectively with clutches 20 and 21. The force flux is transmitted to the second driven axle 12 from the electric machine 16 and/or the internal combustion engine 15 either via the first component transmission 18 or the second component transmission 19 depending on which gear speed is engaged in the double clutch transmission 17. Furthermore, according to FIG. 1, a clutch 22 is connected between the internal combustion engine 15 and the second electric machine 16. The clutch 22 can be opened to decouple the internal combustion engine 15 from the second driven axle 12.

According to FIG. 1, an electrical energy store 23 and power electronics 24 interact with both the first electric machine 14 assigned to the first axle 10 and the second electric machine 16 assigned to the second axle 12. The electrical energy store 23 is discharged to a relatively high degree by the respective electric machine 14, 16 operating in the motor mode. On the other hand, the electric energy store 23 is charged to a relatively high degree by the respective electric machine 14, 16 in the generator mode.

There can also be separate power electronics and/or a separate electric energy store provided for each of the two electric machines 14 and 16.

FIG. 1 also shows a motor control device 25 and a transmission control device 26. In the exemplary embodiment shown, the motor control device 25 actuates both electric machines 14 and 16 and the internal combustion engine 15. The transmission control device 26 actuates the double clutch transmission 17. For this purpose, the control devices 25, 26 exchange data with one another and with the devices 14, 15, 16, 17 that are to be actuated or controlled.

With such a high-performance hybrid vehicle it is necessary to make available in accordance with the demand a consumption-optimized operating strategy or driving strategy, on the one hand, and an acceleration-optimized driving strategy or operating strategy, on the other. There is therefore a need for a method for operating a hybrid vehicle with which either a consumption-optimized driving strategy or operating strategy or an acceleration-optimized driving strategy or operating strategy can be made available and selected efficiently.

The invention was made in view of this need and an object of the invention is to provide a novel method for operating a hybrid vehicle.

SUMMARY OF THE INVENTION

According to the invention, during each current driving cycle of the hybrid vehicle a kilometer reading/mileage reading, or a variable representing the kilometer reading/mileage reading, of the hybrid vehicle is determined. An operating strategy is determined for a subsequent new driving cycle of the hybrid vehicle on the basis of the kilometer reading/mileage reading, or the variable representing the kilometer reading/mileage reading, of the previous driving cycle. According to the invention, the operating strategy or driving strategy for a new driving cycle is selected and used as a function of a driving style that was determined for a preceding driving cycle. For this purpose, a kilometer reading/mileage reading of the hybrid vehicle is determined for each current driving cycle and preferably is stored in a memory. The operating strategy or driving strategy is determined on the basis of the kilometer reading/mileage reading of the preceding vehicle for the subsequent new driving cycle. Such determination and use of a driving strategy or operating strategy permits both a consumption-optimized and an acceleration-optimized driving behavior of the motor vehicle to be made available in a particularly preferred way since it can be assumed that the desired driving properties of the motor vehicle do not change between two directly successive driving cycles.

A new driving cycle preferably is started with a consumption-optimized operating strategy when the kilometer reading/mileage reading of the preceding driving cycle corresponds to an energy-saving driving style. On the other hand, a new driving cycle preferably is started with an acceleration-optimized operating strategy when the kilometer reading/mileage reading of the preceding driving cycle corresponds to a sporty driving style.

The first axle preferably is driven exclusively electrically during the consumption-optimized operating strategy, while the internal combustion engine is deactivated and decoupled from the second axle together with the second electric machine, or each second electric machine. At least the second axle and, if appropriate, additionally the first axle respectively are driven exclusively electrically during the acceleration-optimized operating strategy available. In this context the deactivated internal combustion engine is entrained by the second electric machine, or by each second electric machine, and started when necessary. The above implementation or provision of the consumption-optimized operating strategy and the acceleration-optimized operating strategy is particularly preferred.

BRIEF DESCRIPTION OF THE DRAWINGS

FIG. 1 shows a schematic illustration of a drive train of a hybrid vehicle clarifying the method according to the invention for operating a hybrid vehicle.

DETAILED DESCRIPTION OF THE PREFERRED EMBODIMENT

The present invention relates to a method for operating a hybrid vehicle having a plurality of driven axles, preferably the high-performance hybrid vehicle, as shown in FIG. 1. The first axle 10 can be driven exclusively electrically while the second axle 12 can be driven electrically and/or in a combustion-engine-operated fashion.

Details have already been given on the basic structure of the drive train of the high-performance hybrid vehicle above in conjunction with FIG. 1, so that to avoid unnecessary repetitions reference is made to the statements regarding FIG. 1.

According to the invention a kilometer reading/mileage reading, or a variable representing the kilometer reading/mileage reading, of the hybrid vehicle is determined during each current driving cycle of the hybrid vehicle for easily solving a conflict of objectives between a consumption-optimized driving strategy and an acceleration-optimized driving strategy in such a high-performance hybrid vehicle.

An operating strategy is determined for a new driving cycle is determined when the new driving cycle is started. The determination is made on the basis of the kilometer reading/mileage reading determined for the preceding driving cycle, or the variable representing this kilometer reading/mileage reading. The operating strategy is determined so that the new driving cycle is started with a consumption-optimized operating strategy when the kilometer reading/mileage reading of the preceding vehicle corresponds to an energy-saving driving style. However, the new driving cycle is started with an acceleration-optimized operating strategy when the kilometer reading/mileage reading of the preceding driving cycle corresponds to a sporty driving style.

The two successive driving cycles are separated from one another by virtue of the fact that the motor vehicle is switched off. More particularly, the entire drive train of the motor vehicle is deactivated and the motor vehicle is switched off by pulling out the ignition key or by some other device that terminates the operation of the motor vehicle.

Thus, for example, when the ignition key is inserted and the motor vehicle is started, the operating strategy for the hybrid vehicle is selected and is used at least initially in the new driving cycle on the basis of the kilometer reading/mileage reading determined for the preceding driving cycle and which is interpreted either as an energy-saving driving style or as a sporty driving style.

In the drive train of the high-performance hybrid vehicle in FIG. 1, the consumption-optimized operating strategy or driving strategy is made available by virtue of the fact that said high performance hybrid vehicle is driven purely electrically exclusively via the first axle 10, specifically by the electric machine 14 assigned to the first axle 10. Specifically, both clutches 20 and 21 of the double clutch transmission 17 are opened In this consumption-optimized operating strategy so that both the internal combustion engine 15 and the second electric machine 16 are decoupled from the second axle 12, which is not driven in the consumption-optimized operating strategy. Therefore, gear speeds in both component transmissions 18 and 19 are disengaged at the double clutch transmission 17. The clutch 22 can either be closed or open.

Accordingly, an exclusively electro-motive drive of the hybrid vehicle via the first axle 10 is provided in such a consumption-optimized operating strategy. Decreases in efficiency are avoided as far as possible by opening the clutches 20 and 21 and by disengaging the gear speeds in the transmission 17. The combustion engine 15 is deactivated, and hence no fuel is consumed at the internal combustion engine 15. However, the acceleration behavior with such a consumption-optimized operating strategy is relatively inert because, on the one hand, only the electric machine 14 is used for driving and also because, preparations would first have to be made to make available a drive torque at the second axle 12 in response to a spontaneous power request.

For this purpose, a gear speed must then be engaged in one of the component transmissions 18 and 19 of the double clutch transmission 17 and the electric machine 16 and/or the internal combustion engine 15 also would have to be started and coupled to the second axle 12 by closing at least one of the clutches 20, 21 and 22. Although the consumption-optimized operating strategy makes available an optimized efficiency level, it is not suitable for a desired sporty driving behavior.

The acceleration-optimized operating strategy is made available to ensure a sporty driving behavior at the start of an operating cycle. Therefore, driving initially is purely in the electric mode in the acceleration-optimized operating strategy with a drive torque being made available at least at the second driven axle 12 via the second electric machine 16 and the double clutch transmission 17. For this purpose, a gear speed is engaged at least in one component transmission 18, 19 and one of the clutches 20, 21 of the double clutch transmission 17 is closed as a function of the gear speed in which the vehicle is driven.

Furthermore, the clutch 22 is closed in the acceleration-optimized operating strategy and the internal combustion engine 15 accordingly is entrained. As a result, the internal combustion engine can be started immediately in response to a spontaneous power request by the injection of fuel and subsequent ignition of the internal combustion engine 15 to make available its output torque immediately at the second axle 12.

A reduced efficiency level and higher consumption arise on the basis of the engine drag torque that occurs here at the internal combustion engine 15. However, it is possible to react to a spontaneous power request in an acceleration-optimized fashion. In the acceleration-optimized operating strategy, the first axle 10 can also be driven electro-motively via the same assigned electric machine 14.

The kilometer reading/mileage reading, or the variable representing the kilometer reading/mileage reading, in the respective current driving cycle preferably is determined by the control device 25. For this purpose the total electric power that is output by the two electric machines 14 and 16 and the total combustion-engine-related power that is output by the internal combustion engine 15 are determined for this purpose over a defined time window of the respective current driving cycle or alternatively also over the entire respective current driving cycle.

A sporty driving behavior is inferred when the total power determined in this way exceeds a predefined limiting value. Thus, the acceleration-oriented operating strategy is used at least at the start of the new driving cycle.

On the other hand, the control device infers that the vehicle is being driven in an energy-saving fashion in the preceding driving cycle when the total power that is determined is less than the limiting value, and thus the consumption-optimized operating strategy is selected as an operating strategy at least at the start of the new driving cycle.

As a result, the operating strategy is selected at the start of a new driving cycle can be adapted in an automatic and optimum fashion to a probable driver's request for the new driving cycle.

What is claimed is:

1. A method for operating a hybrid vehicle having a first driven axle that can be driven exclusively electrically by at least one first electric machine assigned to the first axle, and having a second driven axle that can be driven by at least one of a second electric machine assigned to the second axle and an internal combustion engine assigned to the second axle, the hybrid vehicle further having at least one control device for controlling the internal combustion engine and the electric machines, the method comprising:

operating the hybrid vehicle for a plurality of driving cycles;

determining specified vehicle operating variables indicative of an operating strategy of a driver of the hybrid vehicle during each of the driving cycles of the hybrid vehicle;

storing in a memory the vehicle operating variables indicative of the operating strategy during a most recently completed driving cycle;

starting a new driving cycle;

determining the operating strategy for the new driving cycle of the hybrid vehicle on the basis of the vehicle operating variables of the most recently completed diving cycle stored in the memory; and using the control device to control of the internal combustion engine and the electric machines when starting the new driving cycle based on the determined operating strategy.

2. The method of claim 1, further comprising starting the new driving cycle with a consumption-optimized operating strategy when the vehicle operating variables of the most recently completed driving cycle corresponds to an energy-saving driving style.

3. The method of claim 2, further comprising driving the first axle exclusively electrically by the first electric machine during the consumption-optimized operating strategy.

4. The method of claim 3, further comprising deactivating the internal combustion engine and decoupling the internal combustion engine and the second electric machine from the second axle during the consumption-optimized operating strategy.

5. The method of claim 4, wherein gear speeds are configured in a transmission assigned to the second axle.

6. The method of claim 4, further comprising starting the internal combustion engine during the consumption-optimized operating strategy in response to a spontaneous power request.

7. The method of claim 2, further comprising starting the new driving cycle with an acceleration-optimized operating strategy when the vehicle operating variables of the most recently completed driving cycle corresponds to a sporty driving style.

8. The method of claim 7, further comprising driving the second axle and the first axle exclusively electrically via the respective electric machines during the acceleration-optimized operating strategy.

9. The method of claim 8, further comprising entraining the deactivated internal combustion engine by the second electric machine.

10. The method of claim 1, further comprising starting the internal combustion engine, which is already coupled to the second axle, in response to a spontaneous power request when the acceleration-optimized operating strategy is started.

* * * * *